Patented Aug. 10, 1926.

1,595,261

UNITED STATES PATENT OFFICE.

ALBERT P. SY, OF BUFFALO, NEW YORK, ASSIGNOR TO NEIL E. MORGAN, OF OGDENSBURG, NEW YORK.

INSECTICIDE AND PROCESS OF PRODUCING THE SAME.

No Drawing. Application filed December 14, 1922. Serial No. 606,963.

This invention relates to improvements in insecticides and to a process of producing the same.

An important object of the invention is to provide a non-poisonous liquid applicable in the form of a fine mist or spray which volatilizes, producing gases deadly to flies of all kinds, roaches, mosquitoes, lice, mites and other insects that are found about the household, buildings, ships and upon animals.

A further object of the invention is to provide an insecticide which may be applied in the form of a fine mist on household furnishings, wall paper, carpets and the like without staining or damaging the same in any way.

A still further object of the invention is to provide an insecticide produced by removing from insect powders formed from certain blossoms a portion of the active principle thereof by combining the same with an oil, the powder being subsequently removed from the oil while still containing a portion of its active ingredients and being usable when dried as a dusting powder for removing lice and mites from poultry and animals.

As is well known to those familiar with the art, one class of insect powders is formed by employing the blossoms of Chamomille De Perse, Fr. Persiche Bertramblumen, G. Pyrethri Flores, Dalmatian flowers, Persian flowers, California cinerarioefolium, this class of insecticides being very effective, particularly so when the powder is made from the closed flowers or buds. This powder is very unsatisfactory for many uses, due to the fact that being in the form of dust, it is inconvenient to apply and this dust sprinkled in the rooms of a building permeates the atmosphere and is breathed in by the occupants, in many instances causing irritation of the nasal tract and sneezing. Furthermore, due to the large percentage of powder which accomplishes no results, it is not very economical for use. These objections I overcome and obtain a composition which is much more satisfactory in use for the many purposes for which it is intended by employing an oil, for example high grade hydrocarbon oil, and placing it in a suitable vat or mixer. This vat is preferably of that type formed of copper and having a steam jacket, and in the vat the oil is heated to about 100° centigrade. This degree of heat has been found to remove from powders of this character substantially all of the volatile active principles thereof without being destructive to any of such volatile principles. To the heated oil is added approximately two pounds of powder formed from the closed flowers above referred to to each gallon of oil. The proportion of flowers to oil will vary, depending upon the quality of flowers employed, as when the poorer quality or open flower powder is employed, a larger proportion of flower dust to the mixture is necessary to obtain the exact amount of active principles. The mixture of oil and powder is agitated and allowed to stand for approximately twelve hours, the heat being removed at the time of addition of the powder to the oil. The oil menstruum is then removed by siphoning and filtering.

This oil now contains the active principles of the flowers in solution and may be employed for a base for liquid insecticide. To this base can be added small proportions of carbon tetrachloride or the like to render the composition nonexplosive, and non-inflammable, also any suitable vegetable, synthetic, aromatic fixed perfume or other oils to improve the odor of the composition for use in the household and the like. The above substances are merely added for the purposes set forth and will only be added in sufficient quantities to attain the desired effects.

I have found by tests that a small percentage of the active principles remain in the insect powder flowers after the menstruum has been removed. I, therefore, recover the oily cake from the filter press, and dry and regrind the same, the resulting powder being suitable for use as a lice and insect destroyer on animals and poultry.

It will be obvious that since both the powder employed in making the solution and the solution itself are used for insecticides, the production thereof is rendered extremely economical and at the same time a liquid insecticide is provided which is capable of many uses to which the powder may not be put. It will be obvious that the proportion of oil to the flowers may be altered within certain limits without departing from the spirit of my invention, and I accordingly do not limit myself to the specific proportions above set forth except as hereinafter claimed.

I claim:

1. A process of producing a clear homogeneous liquid fly and insect repellant, containing the active principles of pyrethrum, consisting in heating a volatile oil to the point of volatilization of the active ingredients of pyrethrum, removing the heat and adding pyrethrum to the heated oil, agitating the mixture while cooling, and filtering the mixture to completely remove the pyrethrum therefrom.

2. A process of coincidently producing a homogeneous fly and insect repellant containing the active ingredients of pyrethrum and a dusting powder likewise containing said ingredients, consisting in heating a volatile oil to the point of volatilization of the active ingredients of the pyrethrum, removing the heat and adding to the heated oil pyrethrum, agitating the mixture while cooling, filtering the mixture to completely remove the pyrethrum thereform and thereby produce the liquid fly and insect repellant, and drying and grinding the filter cake to thereby produce the dusting powder.

In testimony whereof I hereunto affix my signature.

ALBERT P. SY.